US006381887B1

(12) United States Patent
Williams

(10) Patent No.: US 6,381,887 B1
(45) Date of Patent: May 7, 2002

(54) INTEGRAL LENTICULAR PICTURE BOX PRESENTING SIX LENTICULAR IMAGES

(75) Inventor: Roland L. Williams, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/580,140

(22) Filed: May 30, 2000

(51) Int. Cl.[7] ................................................ G03B 25/02
(52) U.S. Cl. ...................................................... 40/454
(58) Field of Search ........................... 40/427, 436, 437, 40/442, 443, 444, 451–454, 471, 473, 476, 538, 539, 720, 735; 434/365; 359/463, 464

(56) References Cited

U.S. PATENT DOCUMENTS

| 3,561,146 A | 2/1971 | Dembar |
| 4,854,060 A | 8/1989 | Corbo et al. |
| 4,870,768 A | 10/1989 | Watt et al. |
| 4,937,960 A | 7/1990 | Otake |
| 5,226,252 A | 7/1993 | Haluska |
| 5,309,657 A | 5/1994 | Spencer |
| 5,695,346 A | 12/1997 | Sekiguchi et al. |
| 5,757,545 A | * 5/1998 | Wu et al. .................... 359/463 |
| 5,828,495 A | * 10/1998 | Schindler ..................... 359/621 |

* cited by examiner

Primary Examiner—Christopher F. Schwartz
(74) Attorney, Agent, or Firm—William F. Noval

(57) ABSTRACT

A lenticular image product comprising an integral bendable lenticular lens sheet formed into a six-sided cube, said lenticular lens sheet having lenticular lens facing outwardly of said cube, two or more of said sides of said cube having lenticular images viewable through said lenticular lens which display different lenticular effects including two or more of the following; morphing, flip, zooming, motion, animation, depth when said cube is rotated about on axis of rotation, said lenticular lens extending parallel to said axis of rotation.

4 Claims, 3 Drawing Sheets

INTEGRAL LENTICULAR PICTURE BOX PRESENTING SIX LENTICULAR IMAGES

FIELD OF THE INVENTION

This invention relates in general to lenticular imaging and relates more particularly to an integral lenticular image box for displaying several individual or related lenticular images.

BACKGROUND OF THE INVENTION

Lenticular images include an array of cylindrical lenses (or lenticules) in a lenticular material and a sequence of spatially multiplexed images that are viewed through the lenticular material so that different ones of the multiplexed images are viewed at different angles by the viewer. One image effect produced by the lenticular image is a depth or stereoscopic image where the lenticules are oriented vertically and one eye views one image of a stereo pair or sequence from one angle and the other eye views another image from the stereo pair. Another image effect is a motion image where different images on a motion image sequence are viewed by both eyes, while changing the angle at which the image is viewed. In this image effect, the lenticules can be oriented in either the horizontal or vertical direction and the lenticular material is rotated about the long axis of the lenticules. Other effects that combine these two effects, or form collages of unrelated images that can be viewed from different viewing angles can be provided. Other effects include zoom images (one or more images are zoomed from wide angle to narrow angle views), flip images (images of different scenes which may or may not be related), animation images (images simulate motion of an unanimate object), computer generated images, or combinations of different effects.

Lenticular images are formed by decomposing each of several images into image elements equaling the number of lenticules in the lenticular lens element. A set of image elements are multiplexed, one image element for each of the several images, for each lenticule. Thus, if there are ten images and one hundred lenticules, each of the ten images are decomposed into one hundred image elements, and a set of ten image elements, one for each image are associated with each lenticule.

The multiplexed images can be generated as a digital image file and scan printed directly onto a lenticular lens element having a recording layer or printed as a master print which is used to contact print on print media which is laminated to a lenticular lens element or which forms a recording layer of the lenticular lens element.

Typically, two to thirty images can be multiplexed into a single lenticular image. However, there are applications where it is desirable to present in a single lenticular product presenting several different lenticular effects in the same product. Multisided devices are known for displaying a plurality of pictures. (see U.S. Pat. No. 5,309,657, issued May 10, 1994, inventor Spencer; U.S. Pat. No. 4,937,960, issued Jul. 3, 1990, inventor Otake; U.S. Pat. No. 4,870,768, issued Oct. 3, 1989, inventors Watt et al., U.S. Pat. No. 5,226,252, issued Jul. 13, 1993, inventor Haluska; U.S. Pat. No. 4,854,060, issued Aug. 19, 1989, inventors Carbo et al.; U.S. Pat. No. 3,561,146, issued Feb. 9, 1971, inventor Dembar). It is also known to provide a multisided lenticular device to display a plurality of lenticular images (see U.S. Pat. No. 5,695,346, issued December 9, 1997, inventor Sekiguchi et al., FIGS. 155–159, col. 40, line 39, col. 41, line 26). These devices include many parts, and are complex and expensive to manufacture.

There is thus a need to provide a lenticular image product that can display a large number of images but which has few parts and is simple and inexpensive to manufacture.

SUMMARY OF THE INVENTION

According to the present invention, there is provided a solution to the problems discussed above.

According to a feature of the present invention, there is provided a lenticular image product comprising an integral bendable lenticular lens sheet formed into a six-sided cube, said lenticular lens sheet having lenticular lens facing outwardly of said cube, said sides of said cube having lenticular images viewable through said lenticular lens which display a different lenticular effects including two or more of the following; morphing, flip, zooming, motion, animation, depth, when said cube is rotated about on axis of rotation, said lenticular lens extending parallel to said axis of rotation.

ADVANTAGEOUS EFFECT OF THE INVENTION

The invention has the following advantages.

1. A lenticular image product is provided that can display several different lenticular images having different effects, such as morphing, flip, zooming, motion, animation.

2. The lenticular image product is unitary in structure and is simple and inexpensive to manufacture.

DETAILED DESCRIPTION OF THE INVENTION

Figure 1:
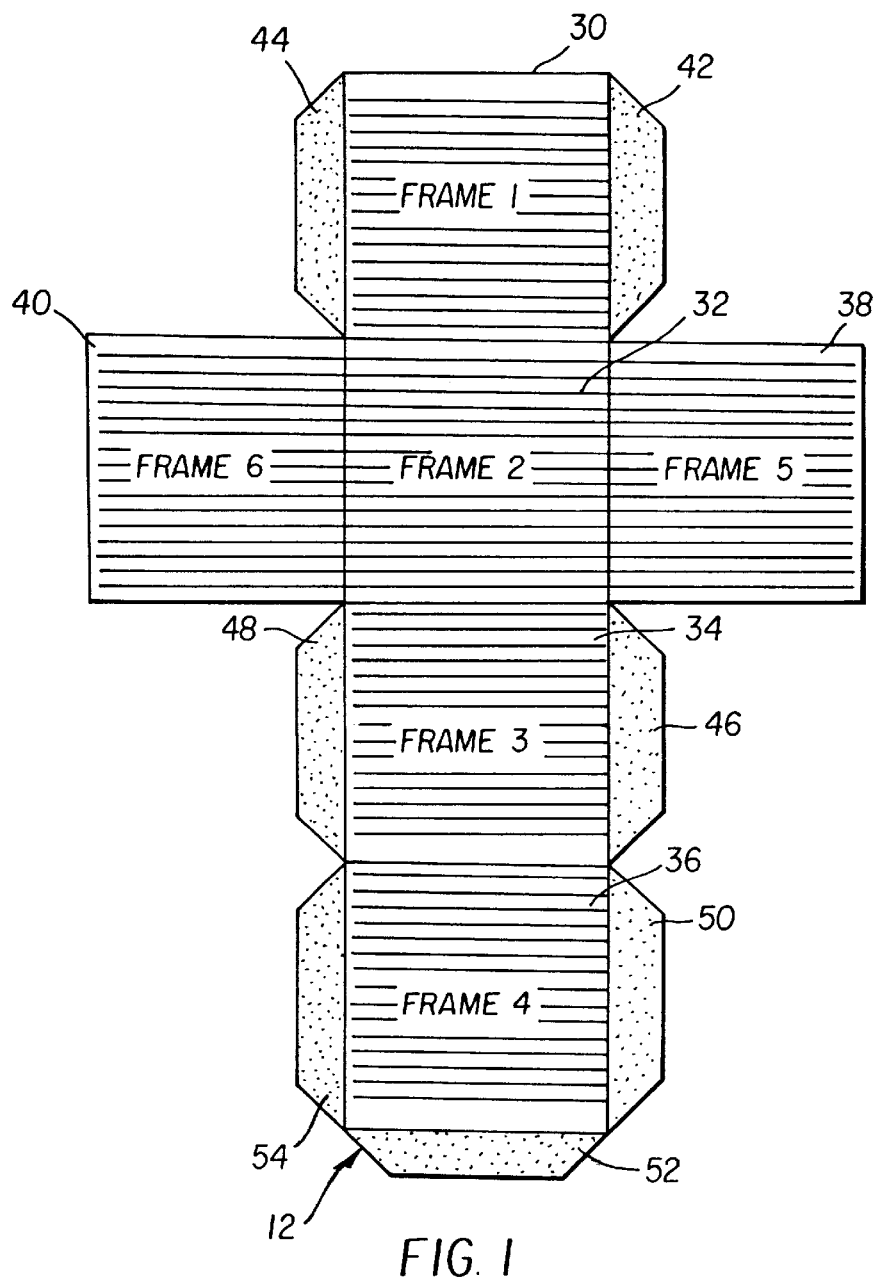
FIGS. 1 and 2 are respective and perspective plan diagrammatic views of the embodiment of the present invention.
Figure 2:
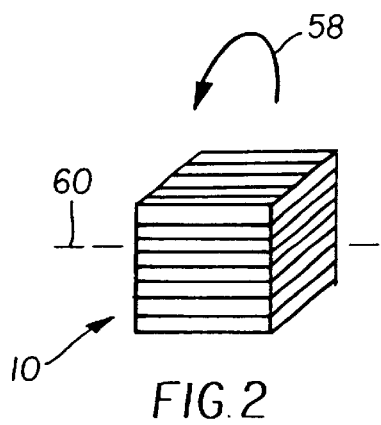
Figure 5:
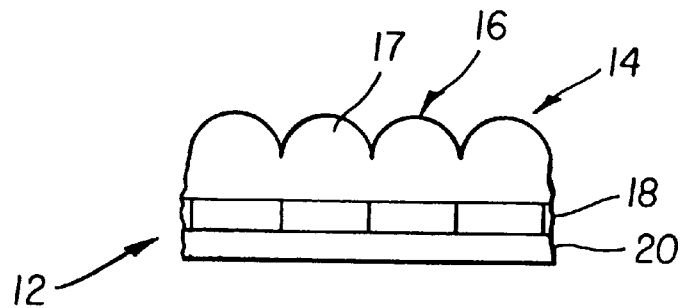
FIGS. 5, 6 and 7 are diagrammatic views useful in explaining the present invention.
Figure 6:
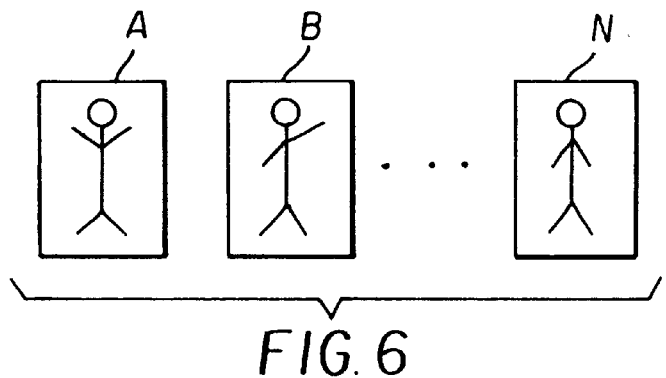
Figure 7:
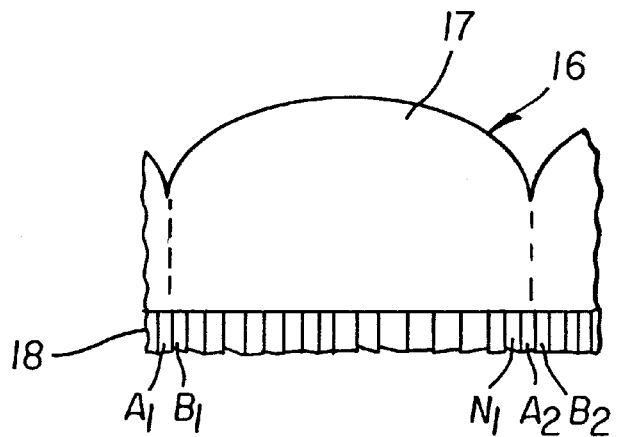

Referring now to FIG. 1, there is shown an embodiment of the present invention. Lenticular lens product 10 (FIG. 2) is a six-sided cube formed from bendable lenticular lens sheet 12. As shown in FIG. 5, lenticular lens sheet 12 includes a lenticular lens element 14 having a parallel array of lenticules 16, (shown as including cylindrical lens 17), a lenticular image 18 and a support 20. Lenticular image 18 is formed by decomposing several images A, B, . . . , N (FIG. 6) into image elements $A_1, A_2 \ldots, B_1, B_2, \ldots, N_1, N_2 \ldots$ equal to the number of lenticules in the lenticular lens element. A set of image elements, $A_1, B_1, \ldots N_1$, are multiplexed, one image element for each of images A, B, ... N, for each lenticule (FIG. 7). The lenticular image is viewed through the lenticular lens to obtain the desired effect (motion, depth, animation, flip, zoom, etc.). In FIG. 1, the bendable lenticular lens sheet 12 is formed in the shape of a cross having six contiguous square image areas 30 (Frame 1), 32 (frame 2), 34 (Frame 3), 36 (Frame 4), 38 (Frame 5), and 40 (Frame 6). Image areas 30, 32, 34, 36 are arranged in a first row, and image areas 38, 40 are disposed on opposite sides of and form a second row with image area 32, Tabs 42 and 44 extend from image area 30, tabs 46, 48 extend from image area 34, tabs 50, 52, 54 extend from image area 36. Tabs 42–54 have adhesive (glue) applied to them. Cube 10 is formed by bending sheet 12 at the borders between image areas and sealing the edges together by means of adhesive tabs.

Image areas 30, 32, 34, 36, 38 and 40 present six lenticular images including two or more different lenticular effects, such as, motion, animation, flip, morphing, zooming, depth, etc. Motion images are a sequence of images of an animate subject (human, animal) that display a motion. Animation images simulate motion of an inanimate object (i.e., cartoon figure). Flip images are frames of different scenes which may or may not be related, that appear in succession as the viewer moves left to right relative to the image. Depth images present the viewer with a 3-D effect and reveal looks-around characteristics. As the viewer moves left to right relative to the image, one can see behind the primary object in the image. Zoom images present one or more objects which are zoomed from wide angle to narrow angle views. Morph images display an object that changes from one characterization to a different characterization (e.g., human to monster). These effects can be combined in the same lenticular image, such as, depth flip images, layered depth images.

By rotating the cube on axes parallel to the lenticule axes the lenticular image effect(s) can be viewed as shown in FIGS. 1–4.

The multiplexed lenticular images can be generated as a digital image file and scan printed directly onto the back of the lenticular lens element by laser scanning of an emulsion layer, by ink jet or thermal printing, by xerographic printing, or printed as a master print which is used to contact print on print media which is laminated to or forms a recording layer of the lenticular lens element.

Figure 3:
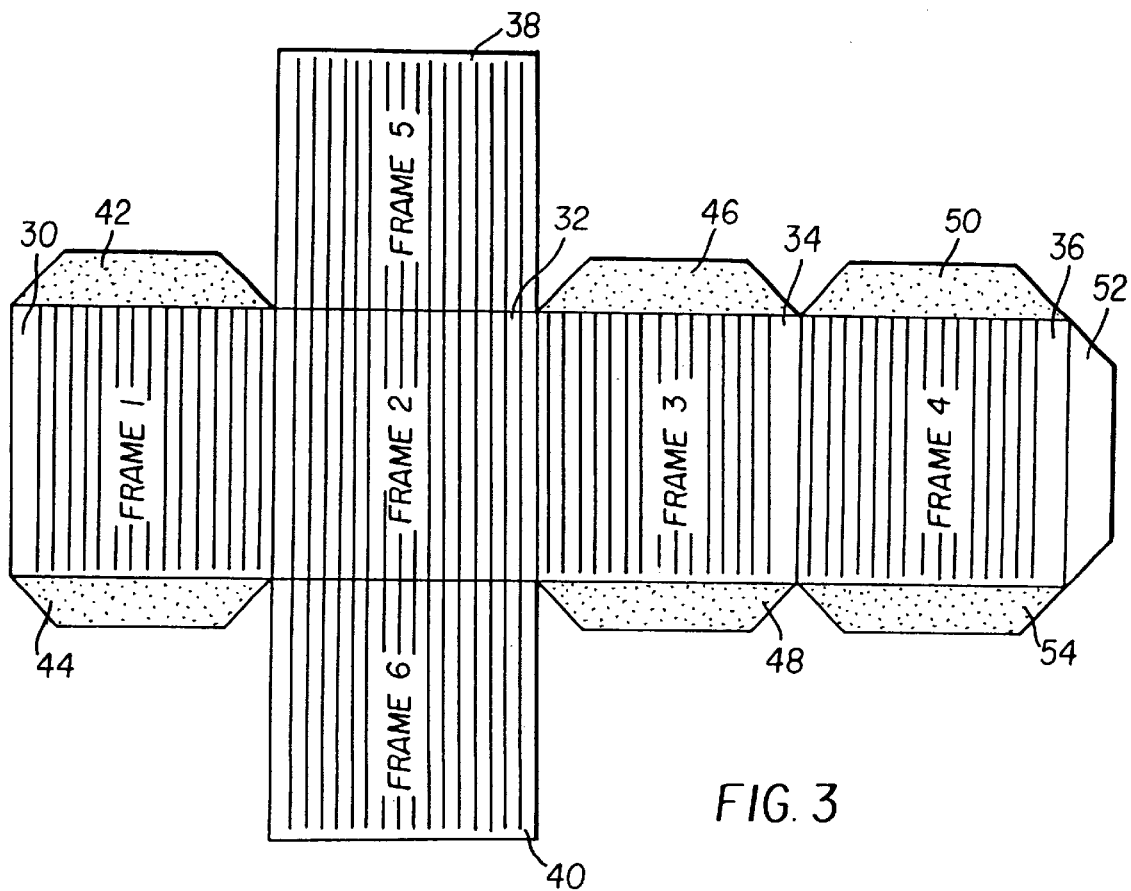
FIGS. 3 and 4 are respective plan and perspective diagrammatic views of another embodiment of the present invention.
Figure 4:
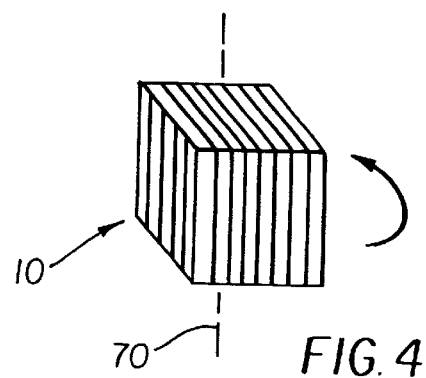

As shown in FIGS. 3 and 4, the lenticules extend vertically, the lenticular images extend parallel to the lenticules and cube 10 is rotated about vertical axis 70 in the direction of arrow 72 to view the continuous motion or animation sequence.

The invention has been described in detail with particular reference to certain preferred embodiments thereof, but it will be understood that variations and modifications can be effected within the spirit and scope of the invention.

| PARTS LIST | |
|---|---|
| 10 | cube |
| 12 | bendable lenticular lens sheet |
| 14 | lenticular lens element |
| 16 | parallel lenticules |
| 18 | lenticular image |
| 20 | support |

| PARTS LIST | |
|---|---|
| 30, 32, 34, 36, 38, 40 | image areas |
| 42, 44, 46, 48, 50, 52, 54 | glue tab |
| 58 | direction arrow |
| 60 | horizontal axis |

What is claimed is:

1. A lenticular image product comprising:

an integral bendable lenticular lens sheet formed into a six-sided cube, said lenticular lens sheet having lenticular lens facing outwardly of said cube, two or more of said sides of said cube having lenticular images viewable through said lenticular lens which display different lenticular effects including two or more of the following; morphing, flip, zooming, motion, animation, depth, when said cube is rotated about on axis of rotation, said lenticular lens extending parallel to said axis of rotation.

2. The lenticular product of claim 1 wherein six sides of said cube have lenticular images viewable through said lenticular lens which display said different lenticular effects as said cube is rotated.

3. A method of forming a lenticular image product comprising:

providing a bendable lenticular lens sheet having a lenticular lens side and an image side having six contiguous image areas in the shape of a cross such that four image areas are arranged in a first row and said remaining two image areas are disposed on opposite sides of and form a second row with one of said image areas of said first row, said second row being perpendicular to said first row;

forming at least first and second lenticular images viewable through said lenticular lens on the image side of at least two contiguous image areas; and forming said bendable lens sheet into a six sided cube with said image areas forming sides of said cube and said lens side facing outwardly, wherein two or more of said sides display different lenticular effects, including two or more of the following; morphing, flip, zooming, motion, animation, depth.

4. The method of claim 3 wherein said lenticular lens sheet includes adhesive tabs extending from one or more of said image areas and wherein said tabs seal said sides of said formed cube.

* * * * *